United States Patent

[11] 3,578,286

[72] Inventor Boleslaw Klimek
 Des Plaines, Ill.
[21] Appl. No. 851,205
[22] Filed Aug. 19, 1969
[45] Patented May 11, 1971
[73] Assignee Berg Mfg. & Sales Co.
 Des Plaines, Ill.

[54] DRAIN VALVE
 5 Claims, 1 Drawing Fig.
[52] U.S. Cl. ................................................ 251/303,
 251/339, 29/157.1, 29/512
[51] Int. Cl. ........................................ F16k 1/16,
 B21d 53/10
[50] Field of Search .......................................... 29/157.1,
 512; 251/303, 339

[56] References Cited
 UNITED STATES PATENTS
 2,563,992 8/1951 DeGrave .................. 29/157.1X
 2,598,417 5/1952 Niemann ..................... 251/303
 FOREIGN PATENTS
 24,833 12/1951 Finland ....................... 29/512

Primary Examiner—Henry T. Klinsiek
Attorney—Parker, Carter & Markey

ABSTRACT: A fitting part has a flared slot in which is received the open end portion of a cup-shaped closure, the fitting and closure forming a chamber. A valve member is tiltable in an opening in the closure and yieldingly urged thereagainst. A seal is carried by the fitting part adjacent the flared slot.

Patented May 11, 1971
3,578,286
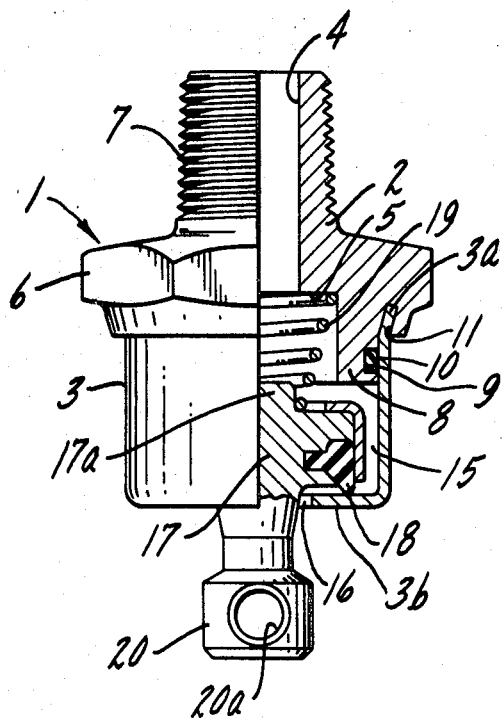
INVENTOR.
Boleslaw Klimek
BY Parker, Carter & Markey
Attorneys.

3,578,286

DRAIN VALVE

SUMMARY OF THE INVENTION

A simplified drain valve includes a fitting having a bore therethrough, an extension carrying an external seal and a flared groove surrounding the base of the extension and open in the direction of the extension. A cup-shaped closure has a deformable open end seated in the groove to secure the closure to the fitting and to form therewith a chamber communicating with the bore. The closure has an opening in its base wall and a valve member is yieldingly urged within the chamber into position closing said opening, the valve member having an extension through the opening for tilting or moving the valve member with respect to the closure.

This invention relates to drain valves and has for one of its purposes the provision of a drain valve which shall be fully effective and which shall yet be manufactured and employed at minimum cost.

Another purpose is to provide a drain valve of maximum simplicity and having a minimum of parts.

Another purpose is to provide a moisture drain valve having a seal member located away from the moisture collection area.

Another purpose is to provide a sealed drain valve housing.

Another purpose is to provide a disposable drain valve assembly.

Other purposes may appear from time to time during the course of the specification and claims.

BRIEF DESCRIPTION OF THE DISCLOSURE

The invention is illustrated more or less diagrammatically in the accompanying drawing wherein:

The FIGURE is a side elevation in partial cross section.

Like parts are indicated by like numerals throughout the specification and drawing.

DESCRIPTION OF THE PREFERRED EMBODIMENT

Referring now to the drawing, the numeral 1 generally designates a valve housing. The housing 1 is formed of a fitting part 2 and a closure part 3. Part 2 is a relatively massive, fixed body. Part 3 is of relatively thin metal having a deformable open end portion 3a. The fitting 2 has an axial bore 4 therethrough. The bore 4 may be enlarged at its inner end, forming the shoulder 5. The fitting part 2 has a tool-engageable external surface 6 between a threaded extension 7 and a circumferential extension 8.

The external circumferential surface of the extension 8 has an outwardly open groove 9 in which a seal 10 is carried, the groove 9 and seal 10 being adjacent the distal end of the extension 8.

Surrounding the base of the extension 8 is a flared groove 11. The groove 11 is open in the direction of the extension 8 and, as shown, is flared or inclined outwardly therefrom.

The cup-shaped closure portion 3 has its open end portion 3a received in the groove 11. The circumferential wall of the closure 3 engages the seal 10 adjacent the groove 11 and the closure 3 extends therefrom to define with the fitting 2 a moisture collection chamber 15. The base wall 3b of closure 3 is centrally apertured as at 16.

A valve member 17 carries an annular valve seal 18 for seating upon the inner surface of the wall 3b about the opening or aperture 16 to close the same. A spring 19 has one of its ends seated on the shoulder 5 and its opposite end active against the valve 17, the spring 19 being retained or positioned by an axial extension 17a on the valve 17.

Valve member 17 has an axial extension 20 which extends from the body of the valve 17 through the aperture 16 which carries an attachment configuration, such as the bore 20a, externally of housing 1.

The use and operation of the invention are as follows:

The valve of the invention is manufactured at minimum cost and with maximum simplicity. The housing portion or closure 3 formed of relatively thin metal is moved toward the fitting part 2. At this stage the spring 19 and valve member 17 are positioned between the two parts and the circumferential wall of part 3 is of a constant diameter throughout. As the parts 2 and 3 are moved toward each other, the extension 8 of part 2 enters part 3 bringing the seal 10 into engagement with the inner surface of the circumferential wall of part 3 and the spring 19 begins to be compressed. As the parts are moved further together the open edge portion 3a of part 3 enters the groove 11 in part 2. Under continued pressure the end portion 3a of the circumferential wall of part 3 is formed, i.e., flared or inclined, as it traverses further into and finally seats within and fills the flared or inclined groove 11 in its entirety, thus securing the parts 2 and 3 together.

It will be understood that a suitable operating means, such as a cable or rod (not shown) is secured to the configuration 20a on the extension 20 of valve 17. The threaded extension 7 of the part 2 is suitably connected to a structure to be drained, an air pressure reservoir of a vehicle brake system, for example (not shown). The operator moves valve member 17 to unseat it from at least a portion of the wall 3b of part 3 and thus to open communication between the chamber 15 and atmosphere through the opening 16 and to drain the moisture collection chamber 15. The valve member 17 may be pressed inwardly against the spring 19, or it may be tilted. The seal 10 being positioned away from the opening 16 is thus spaced above moisture collection chamber 15 in the more common vertical positioning of the valve of the invention.

I claim:

1. A drain valve including a fitting part and a closure part, said parts together forming a housing and defining therewithin a moisture collection chamber, said fitting part having an annular extension, a seal carried in the external wall of said extension, and an annular flared groove surrounding the base of said extension, said closure having a circular edge portion seated within said groove to join said fitting part and said closure part, said closure part having an inner circumferential wall surface engaging said seal, an opening in an end wall of said closure, a valve member positioned in said chamber and yielding means urging said valve member into position sealing said opening.

2. The structure of claim 1 wherein said closure is generally cup-shaped and formed of relatively thin metal.

3. The structure of claim 1 wherein said opening and seal are on opposite sides of said valve member.

4. The structure of claim 1 wherein said valve member includes an axial extension extending through said opening and having a connection configuration at its distal end.

5. The method of forming a valve housing which comprises the steps of providing a first housing part of relatively rigid material and having an annular extension thereon and a flared annular groove open in the direction of said extension and surrounding the base thereof, providing a second housing portion formed of relatively thin metal and having a circumferential wall and thereafter pressing said extension into said circumferential wall to force the circular edge of said wall into said groove.